April 5, 1938.  T. W. CAREY  2,112,950
BRAKE CONTROL FOR MOTOR VEHICLES
Original Filed Dec. 11, 1933
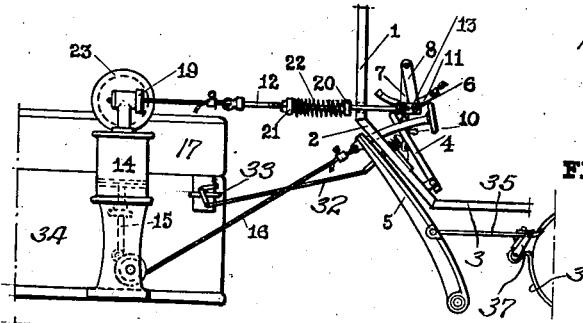
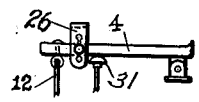
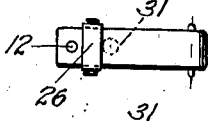
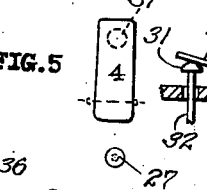
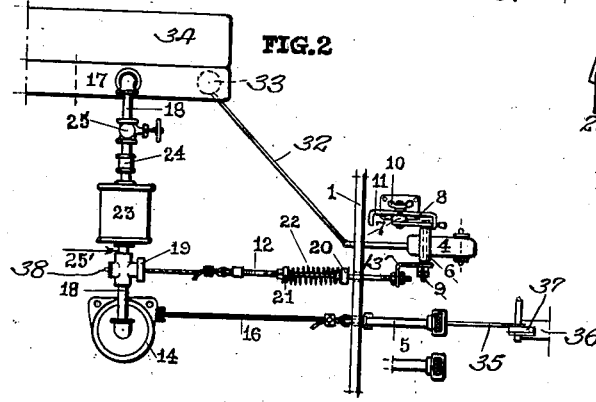
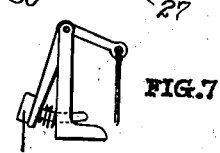
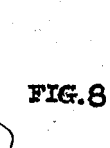
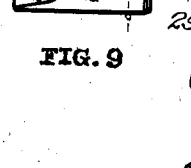
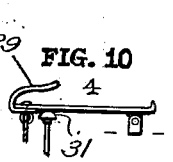
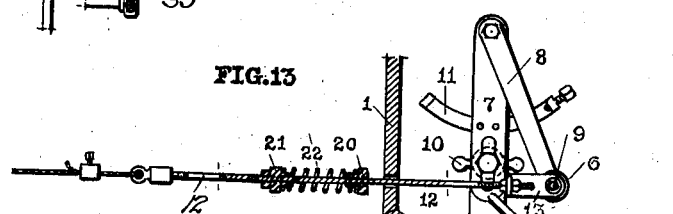
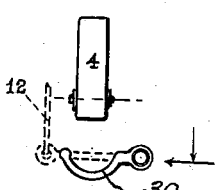
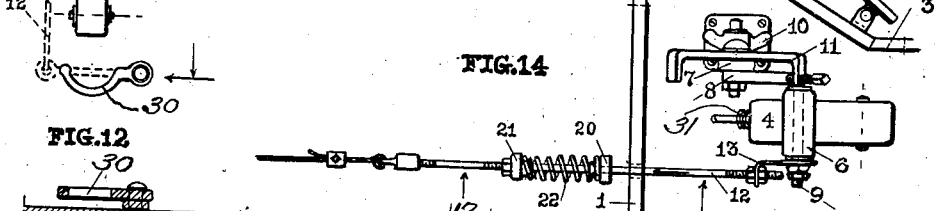
INVENTOR
Thomas William Carey,
BY
Arthur Yancey
ATTORNEY Patented Apr. 5, 1938

2,112,950

UNITED STATES PATENT OFFICE 2,112,950

BRAKE CONTROL FOR MOTOR VEHICLES

Thomas William Carey, New Orleans, La.

Refiled for abandoned application Serial No. 701,773, December 11, 1933. This application May 6, 1936, Serial No. 78,278

4 Claims. (Cl. 192—3)

This invention relates to brake controls for motor vehicles, particularly to semi-automatic brakes.

One object of the invention is to provide means whereby a driver can apply his brakes while his foot is on the accelerator pedal, thereby avoiding loss of time, inconvenience and probable danger of applying brakes in the conventional way, which requires removal of the driver's foot from the accelerator pedal and stepping on the brake pedal.

The usual suddenness of accidents is apt to confuse a driver and prevent his stepping from the accelerator pedal onto the brake pedal. If the car careens, this may be difficult. If the driver is thrown from his seat, it may be impossible.

The purpose of the invention is to increase safety, comfort and ease of driving by enabling the driver to apply his brakes without moving his foot from the accelerator.

Another object of the invention is to provide means for gradual application of the brakes, thereby avoiding such accidents as may result in locking the wheels too suddenly when applying the brakes.

Another object is to provide a power brake system that will not depend entirely upon the engine's running or become inoperative should the engine stop.

Another object is to provide means to graduate the power that applies the brakes.

For disclosure and demonstration, a simple form of the invention has been selected which is presently believed to be best suited for its illustration, with the understanding however that the invention is not to be limited to the specific form shown and described.

In the drawing:

Fig. 1 is a view in elevation of the semi-automatic brake control for motor vehicles.

Fig. 2 is a plan view of the same with some parts removed to clear the view of others.

Fig. 3 and Fig. 4 are details, respectively in elevation and plan, of a modified form of the invention, hereinafter further described.

Fig. 5 and Fig. 6 show details, respectively in plan and section, of another modification, hereinafter further described.

Fig. 7 and Fig. 8, respectively in front and side views of another modification of the invention, hereinafter further described, show details of the invention.

Fig. 9 and Fig. 10 are details, respectively in plan and elevation, of another modification of the invention, hereinafter further described.

Fig. 11 and Fig. 12 are details, respectively in plan and section, of another modification of the invention, hereinafter further described.

Fig. 13 and Fig. 14 show, respectively in elevation and plan, enlarged details of Figures 1 and 2.

Following is a description of parts of the invention together with that of co-operating other parts:

1 indicates the usual partition between the driver's compartment and that for the engine of an automobile.

2 and 3 indicate respectively the pedal board and floor of an automobile.

4 shows the usual accelerator pedal. This is the well known means for controlling the motive power or supply of gasoline or other medium imparting motion.

5 represents the usual brake lever and pedal.

6 shows the brake controller or means located near the accelerator pedal and within easy access of a driver's foot when it is in contact with said pedal. In the illustrated or preferred form shown, this part consists of a short, revoluble spool-like member, or sleeve roller, positioned transversely above, and near the toe end of the accelerator pedal, as shown in the drawing and hereinafter more fully described.

7 shows a pair of members comprising a stanchion mounted on the pedal board or floor of an automobile and adapted, together with other co-operating members described below, to movably support the aforesaid brake controller.

8 is a pivoted arm mounted near the upper end of the aforesaid stanchion member.

9 shows a pin mounted on the oscillatable end of the pivoted arm aforesaid and adapted to revolubly support the brake controller aforesaid.

10 shows means for adjusting the aforesaid stanchion members vertically and horizontally, consisting of slots in the stanchion members and a bolt and wing nut to position and hold the controller for operation by a driver's foot in contact with the accelerator pedal.

11 is a bracket supported by the stanchion aforesaid and provided with a set screw to limit the swing of the oscillatable arm aforesaid.

12 shows the controller rod.

13 is an angular connector adjustably securing the controller rod to the brake controller aforesaid.

14 represents the brake cylinder provided with a piston adapted to be operated by any suitable medium of power.

15 is the piston rod.

16 is a flexible cable connecting the aforesaid piston rod and the brake lever, reeving on the pulley or fair-leader as shown.

17 is any suitable medium of power, or mechanism. In the illustrative form of the invention herein shown, this element comprises part of the intake manifold of the automobile's engine as a source of vacuum.

18 shows a pipe system connecting the brake cylinder with the vacuum source.

19 represents any suitable valve on the aforesaid pipe system, the stem of the valve being connected with the brake controller aforesaid and thereby under the control of the driver. The preferred type of valve 19 is that of the well known poppet valve.

20 is a sleeve slidably mounted on the controller rod.

21 is a threaded sleeve mating with the threaded end of the controller rod and adjustably held thereon by a lock-nut.

22 represents a helical compression spring holding the aforesaid threaded sleeve and slidable sleeve resiliently spaced apart and operating to provide gradual application of the brakes. As shown in Figs. 1, 2, 13 and 14, this spring is in maximum expansion, and in the position shown would not cause the slidable sleeve to contact with the partition.

23 shows a reserve vacuum tank of sufficient capacity for operating the brake mechanism should the engine stop.

24 indicates means to maintain the reserve power. In the illustrated form, this is a check valve.

25 is any suitable means for regulating the power supply: a gate valve, in the presently illustrated form, capable of choking the pipe system and reducing the vacuum pull. The preferred position of this valve is indicated by the arrow 25', Fig. 2.

26, Figs. 3 and 4, is a modified form of the brake controller 6, comprising an adjustable toe strap adapted to operation by a driver's foot or shoe on the accelerator pedal.

27, Figs. 5 and 6, shows another modification of the brake controller 6, comprising a button positioned behind the accelerator pedal and adapted to operation by the heel part of a driver's foot or shoe on the accelerator pedal.

28, Figs. 7 and 8, is another modification of the brake controller 6, comprising a lever mounted on a stanchion positioned and operable by the side of a driver's shoe, a driver's ankle, calf or knee, while his foot is on the accelerator.

29, Figs. 9 and 10, is another modification of the brake controller 6, comprising a member secured to the accelerator pedal and adapted to fit over the toe part of a driver's shoe on said pedal.

30, Figs. 11 and 12, is another modified form of the brake controller 6, comprising a pedal and adapted to operation by the heel part of a driver's shoe on said pedal. The dotted lines in Fig. 11 represent parts below the floor which are invisible in the plan view.

31 is the accelerator, 32 the accelerator rod connecting the accelerator pedal with the carburetor, 33 the carburetor, 34 the engine, 35 the brake rod connecting the brake lever with the brake band lever, 36 the brake band, 37 the brake band lever and 38 is a vent in the poppet valve for admitting air in the brake cylinder when the brakes are released.

In operation, the driver's foot is on the accelerator pedal and the upper part of his shoe under and within easy reach of the brake controller 6. The fuel feed is controlled in the usual way. Brakes are applied by the driver's lifting the toe part of his shoe to contact with the brake controller 6, his heel operating as a fulcrum over the pivot of the accelerator pedal, thereby causing the arm 8 to swing away from the partition 1. This will result in opening the valve 19, due to the connector 13, rod 12 and its other connections with the valve. Vacuum is maintained and now effective from the manifold 17 through the pipe system 18 to and in the cylinder 14. This will lift the piston and piston rod 15 pulling one end of the cable 16 up and the other end down together with the brake pedal and lever 5, applying the brakes. When the driver's shoe releases the controller 6, the valve 19 will close and the brake lever 5 will return to its normal position in the usual way. The brakes are off.

Gradual application of the brakes results from contact of the slidable sleeve 20 with the partition 1, making it thereafter more and more difficult, due to the resistance of the spring 22, for the driver to further open the valve 19 to more firmly apply the brakes.

Reserve power is maintained by the tank 23 and check 24 for operating the brakes in event of the engine's stopping.

Regulation of the maximum vacuum pull is effected by opening or closing the valve 25 which operates to choke the pipe system 18. If the brakes go on too suddenly under pull of rod 12, the said valve should be partly closed to reduce and fix or set the maximum vacuum pull. 19 is preferably a poppet valve and 25 a gate valve.

Having described the parts of my invention in detail and explained their operation in combination, I claim the following combinations and others thereunto equivalent:

1. In a brake control for motor vehicles, a partition, brakes, a stanchion positioned to adjacency to the accelerator pedal, an arm pivotally mounted on said stanchion, a pin mounted near the oscillatable end of said arm, said pin being positioned for operation by a driver's foot on said pedal, a brake controller rod, an adjustable connection for said rod and pin, a threaded sleeve mating a threaded portion of said rod, a slidable sleeve mounted on the rod and a helical spring telescoping the rod and holding the sleeves resiliently spaced apart, whereby the brakes will be applied with increasing resistance and graduation, when said slidable sleeve abuts said partition.

2. In a brake control for motor vehicles, brakes, a pedal operative to govern the motive power, an adjacent stanchion adjustable vertically and angularly, an arm pivotally mounted near the top of said stanchion, a pin supported near the oscillatable end of said arm and a sleeve mounted on said pin co-operable to apply the brakes by a driver's foot in contact with said pedal.

3. In a brake control for motor vehicles, brakes, a stanchion positioned to adjacency to the accelerator pedal, said stanchion comprising members adjustable longitudinally and angularly, an arm pivotally mounted on one of said members and a pin supported by the oscillatable end of said arm, the said pin being positioned for operation, when applying the brakes by a driver's foot on said pedal.

4. In a brake control for motor vehicles, a partition, brakes, a stanchion positioned to adjacency to the accelerator pedal, an arm pivotally mounted on said stanchion, a pin mounted near the oscillatable end of said arm, said pin being positioned for operation by a driver's foot on said pedal, a brake controller rod, an adjustable connection between said rod and pin, a threaded sleeve mating a threaded portion of said rod, a slidable sleeve mounted on the rod and a helical spring telescoping said rod and holding the sleeves resiliently spaced apart, whereby the brakes will be applied with increasing resistance and graduation, when said sleeve abuts said partition.

THOMAS WILLIAM CAREY.